(12) United States Patent
Li

(10) Patent No.: US 12,674,703 B2
(45) Date of Patent: Jul. 7, 2026

(54) USING A STRONG OPTICAL BEAM TO DETECT A WEAK OPTICAL BEAM

(71) Applicant: Chian Chiu Li, Fremont, CA (US)

(72) Inventor: Chian Chiu Li, Fremont, CA (US)

( * ) Notice: Subject to any disclaimer, the term of this patent is extended or adjusted under 35 U.S.C. 154(b) by 147 days.

(21) Appl. No.: 18/889,320

(22) Filed: Sep. 18, 2024

(65) Prior Publication Data

US 2025/0012630 A1     Jan. 9, 2025

Related U.S. Application Data

(63) Continuation-in-part of application No. 17/902,819, filed on Sep. 3, 2022, now Pat. No. 12,146,788.

(51) Int. Cl.
G01J 1/42 (2006.01)
G01J 1/04 (2006.01)
G01J 1/44 (2006.01)

(52) U.S. Cl.
CPC ........... G01J 1/4257 (2013.01); G01J 1/0411 (2013.01); G01J 1/0425 (2013.01); G01J 2001/442 (2013.01)

(58) Field of Classification Search
CPC .... G01J 1/4257; G01J 2001/442; H01Q 3/30; H04B 10/70
See application file for complete search history.

(56) References Cited

U.S. PATENT DOCUMENTS

2017/0205683 A1*   7/2017  Li ........................... H01Q 3/26

OTHER PUBLICATIONS

Matin Hallaji, "Weak-value amplification of the nonlinear effect of a single photon", Jun. 2017 hereafter Hallaji (Year: 2017).*

* cited by examiner

*Primary Examiner* — Maurice C Smith

(57) ABSTRACT

Methods and apparatus for detecting weak beams and single photons. A reference beam interferes with a weak beam to generate an output beam. Characteristics such as propagation direction of the output beam are used to detect the weak beam. The methods further include using an array of reference beams to detect an image formed by weak beams.

20 Claims, 5 Drawing Sheets

Beam 10

Detector 12    Sensing Circuit 14 w 16    17
A - - - - A'

Y

X 20  21  22

Detectors d    17
16 h

Z w

X 16    17

Beam 18

20  21  22

Detectors 16    17

Beam 19

20  21  22

Detectors 16    17

Beam 23 a 20  21  22

Detectors 16    17

Beam 24    b 20  21  22

Detectors

100

200

300

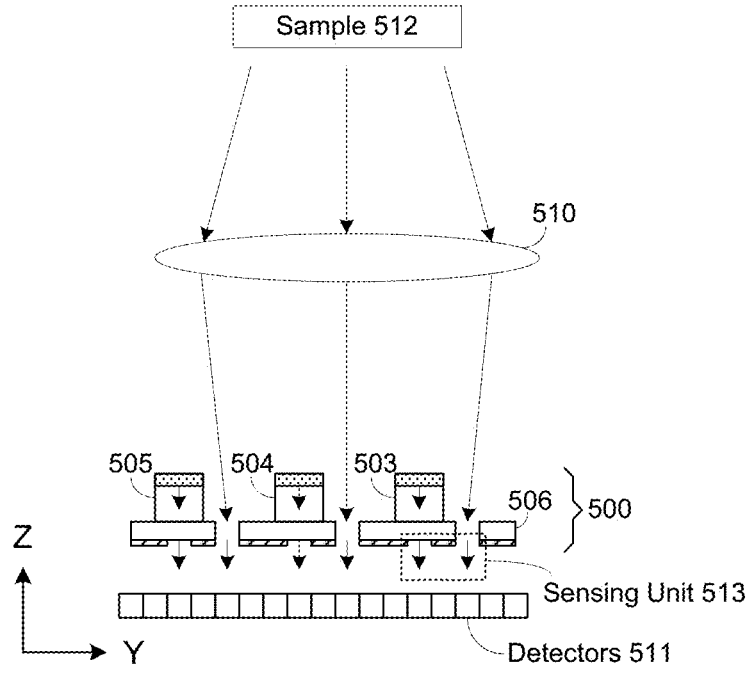
FIG. 7E
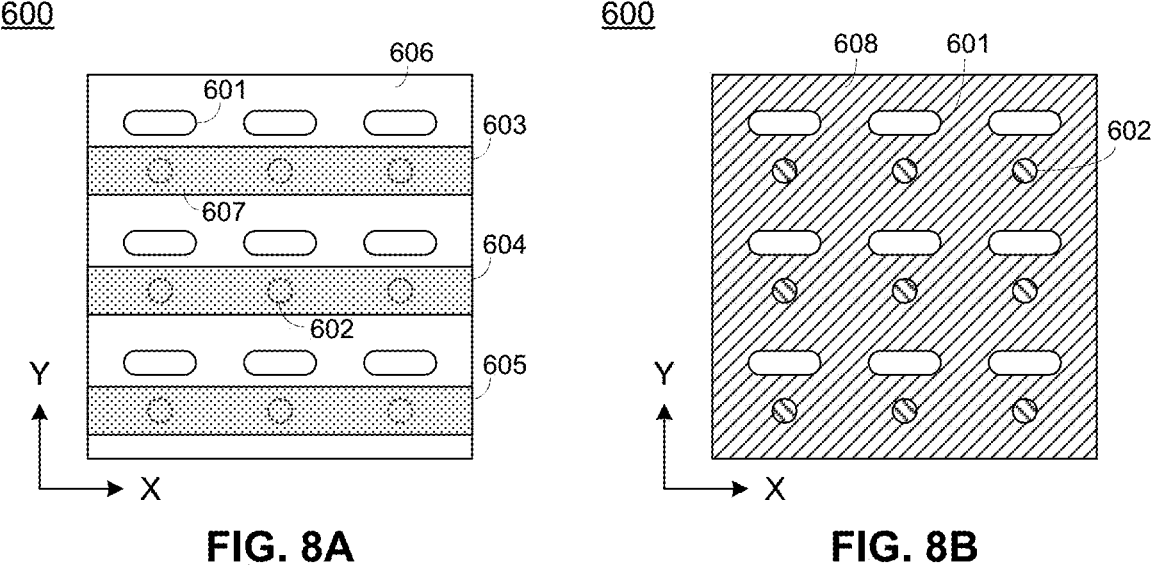
FIG. 8A                    FIG. 8B

USING A STRONG OPTICAL BEAM TO DETECT A WEAK OPTICAL BEAM

CROSS REFERENCE TO RELATED APPLICATION

This is a continuation-in-part of U.S. application Ser. No. 17/902,819, filed Sep. 3, 2022. This application is related to U.S. patent application Ser. No. 15/477,118, filed Apr. 3, 2017, now U.S. Pat. No. 10,601,131, granted Mar. 24, 2020, the entire content of which is incorporated herein by reference

FIELD OF INVENTION

This invention relates to methods and apparatus for optical detection, and particularly to detection of weak beams and single photons.

BACKGROUND OF THE INVENTION

In optical detection, photodiodes are often used as photodetectors. Photodiodes convert an incoming optical signal into an electrical signal. After photons impinge on a photodiode, they are absorbed in an active region of the photodiode, creating electron-hole pairs. The photo-generated charges form an electrical current in an electrical field that is subsequently measured.

When an optical signal is weak, i.e., an optical beam under test has low intensity, the generated electrical current can become too weak for a regular photodiode to detect. Examples of extreme weak signals include single photons. A weak electrical signal can be amplified by charge multiplication. Avalanche photodiodes (APDs) and single-photon avalanche diodes (SPADs) use high reverse voltage to generate charge multiplication. Photomultiplier tubes (PMTs) create charge multiplication in a vacuum tube. Both SPAD and PMT can detect single photons. Besides amplification of photocurrents, superconducting-related phenomena, where cryogenic operating temperatures are likely required, have been used to detect single photons in devices such as transition-edge sensors (TESs) and superconducting nanowire single-photon detectors (SNSPDs). To sense a single photon, a TES detects the change of electrical resistance, while an SNSPD detects a voltage pulse. In general, it is desirable to improve the photon detection efficiency (PDE) in detection of weak beams. Especially for APDs and SPADs, the PDE at wavelengths larger than 1000 nm remains a challenge.

Therefore, there exists a need to improve the PDE in weak beam detections, which may enhance the detection of weak optical signals, in particular the detection of single photons.

The term "beam" as used herein indicates any electromagnetic beam or electromagnetic wave which follows the Maxwell equations and travels in the free space (e.g., in the air or vacuum) or a waveguide. A beam may be of radiation in the optical frequency range or radio frequency range, or in between, or beyond the two ranges. The term "weak beam" as used herein indicates a beam with relatively low power or low intensity. A weak beam includes a single photon. The term "strong beam" as used herein indicates a beam with relatively higher power or higher intensity compared to a weak beam.

OBJECTS AND ADVANTAGES

Accordingly, several main objects and advantages of the present invention are:

a). to provide an improved device and method to detect weak beams;

b). to provide such a device and method that detect a weak beam by sensing the interference between the weak beam and a reference beam;

c). to provide such a device and method that detect a weak beam by sensing an output beam that is generated by the interference between the weak beam and a reference beam;

d). to provide such a device and method that detect a weak beam by sensing characteristics of an output beam that is generated by the interference between the weak beam and a reference beam;

e). to provide such a device and method that improve the PDE in optical detections when a photodiode, APD, SPAD, PMT, TES, or SNSPD is used;

f). to provide such a method and system which detect an image formed by weak beams; and g). to provide such a method and system which use an array of reference beams to detect an image formed by weak beams.

Further objects and advantages will become apparent from a consideration of the drawings and ensuing description.

SUMMARY OF THE INVENTION

In accordance with the present invention, a weak bean is detected by sensing an output beam generated by the interference between the weak beam and a reference beam. The reference beam may be much stronger than the weak beam. The width of and spacing between the weak beam and reference beam are around or smaller than the wavelength, respectively. The propagation direction of the output beam is steered by the phase difference between the weak and reference beams and used to detect the weak beam. The PDE may be improved in optical detections based on photodiodes, APD, SPAD, PMT, TES, or SNSPD. Further, an image formed by weak beams may be detected by interference between the weak beams and an array of reference beams. The reference beams may be generated through an array of holes etched on waveguides.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

FIG. 7E illustrates schematically an arrangement of image detection using the embodiments shown in FIGS. 7A-7D.

FIGS. 8A to 8B illustrate another embodiment to detect an image schematically.

DETAILED DESCRIPTION

The following exemplary embodiments are provided for complete disclosure of the present invention and to fully inform the scope of the present invention to those skilled in the art, and the present invention is not limited to the schematic embodiments disclosed, but can be implemented in various types. Wherever possible, the same reference numbers are used throughout the drawings to refer to the same or like parts.

Figures 1, 2A, 2B, 2C, 2D, 2E, 2F:
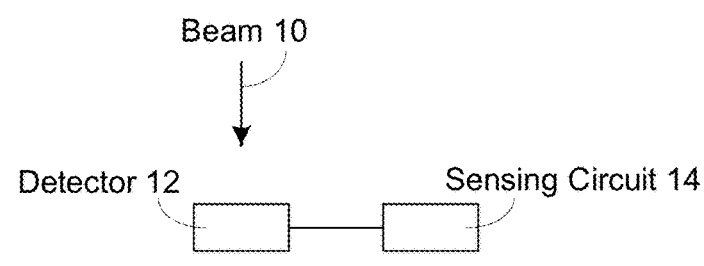
FIG. 1 shows a prior-art method to detect a beam.
FIGS. 2A to 2F illustrate methods to detect a weak beam using a strong beam schematically.

FIG. 1 is a prior-art setup for detecting a beam 10. A detector 12 can be a photodetector that detects the intensity of beam 10 by converting optical signals into electrical signals. The electrical signals are measured by a sensing circuit 14 and then recorded. When the intensity of beam 10 is below a certain level, the electrical signals become too weak for sensing circuit 14 to ascertain. The conventional method as shown in FIG. 1 detects a beam by directly sensing the intensity of the beam. The method is limited by the intensity level.

FIGS. 2A-2F schematically show top and cross-sectional views of a configuration for detecting a weak beam, according to embodiments of the present disclosure. The top views shown in FIGS. 2A and 2C-2F are in an X-Y plane, while the cross-sectional view shown in FIG. 2B is in an X-Z plane and taken along a line AA depicted in FIG. 2A. As in FIGS. 2A and 2B, waveguides 16 and 17 may be formed on a substrate (not shown) and have a width w in the X direction and height h in the Z direction. Waveguides 16 and 17 and detectors 20, 21, and 22 are disposed in the air or vacuum. The spacing between waveguides 16 and 17 is d in the X direction. The width w, height h, and spacing d are around or smaller than the wavelength of beams 18 and 19, respectively. The term "around or smaller than the wavelength" as used herein indicates smaller than one and a half times of the wavelength.

Waveguides 16 and 17 emit coherent beams 18 and 19, respectively, as shown in FIGS. 2C and 2D. When the spacing, width, and height of waveguides 16 and 17 are around or smaller than the wavelength, after beams 18 and 19 are emitted, the spacing between the beams in the X direction and the widths of beams 18 and 19 in the X and Z directions are around or smaller than the wavelength. Further, beams 18 and 19 spread in the X and Z directions while propagating in the Y direction in the free space (i.e., in vacuum or the air). The beams mix and interfere with each other to create an output beam.

Detectors 20, 21, and 22 may be a photodiode, APD, SPAD, PMT, TES, SNSPD, or other types of detecting devices. Detectors 20-22 are used to show the detection configuration exemplarily. 3 or more than 3 detectors may be used. Optionally, the detectors may form a one-dimensional (1D) array along the X direction, as depicted in the figures. In some cases, the detectors may form a two-dimensional (2D) array in an X-Z plane. Provided detectors 20-22 can detect beam 18, but cannot detect beam 19 because beam 19 is weak with an intensity level that is too low for the detectors to detect. In such cases, more sophisticated devices are required to detect beam 19 when conventional methods are used.

It is known that when a weak beam interferes with a strong beam, the weak beam can steer an output beam generated by the interference of the weak beam and strong beam, such as the methods and systems disclosed in U.S.

Pat. No. 10,601,131. The power of the strong beam may be 10 times or even 100 times that of the weak beam. When beams 18 and 19 are emitted in separate time periods, the output beam is either beam 18 or beam 19 that propagates along the Y direction, as shown in FIGS. 2C and 2D. But when beams 18 and 19 are emitted at the same time, the beams interfere with each other, generating an output beam that propagates along a direction determined by the phase difference between beams 18 and 19. For example, an output beam 23 may be steered anticlockwise by an angle a in the X-Y plane as shown in FIG. 2E, or an output beam 24 may be steered clockwise by an angle b in the X-Y plane as shown in FIG. 2F. Hence, if beam 19 is too weak to be detected by the detectors, beam 19 may still be sensed by detecting the output beam. That is, beam 19 may be sensed without direct detection of the intensity of beam 19. In some cases, when the intensity of beam 18 is 5 times, 10 times, or even 100 times of that of beam 19, the intensity of the output beam may be around 5-100 times of that of beam 19. Thus, when detectors 20-23 cannot detect beam 19 directly by measuring its intensity, the detectors may still detect beam 19 by sensing the output beam.

The output beam may have a power level much higher than that of beam 19 and detectors 20-23 are arranged to measure the output beam. As such, the photon detection efficiency (PDE) of the detection system may be increased compared to detecting the intensity of beam 19 directly. Further, when beam 19 contains a single photon, i.e., beam 19 contains a single photon during a time period, beam 18 may contain, e.g., 10-100 photons. In such cases, detection of a single photon may be replaced by detection of multiple photons or tens of photons. Then, the requirements and cost of single photon detection may be reduced in some cases.

In some aspects, before detecting a weak beam, a relatively strong reference beam is provided. Detection of the weak beam is performed by ascertaining the change of an output beam that is generated by the interference between the weak and strong beams. The propagation direction of the output beam is determined by the phase difference between the two beams. When the weak beam is not present, the output beam is the strong beam and has an initial propagation direction. Once the weak beam is present, the interference occurs. The propagation direction of the output beam changes, so does the optical path of the output beam. Any of these changes indicates detection of the weak beam. Further, the change of other characteristics may also be used, such as the position, size, shape, and intensity distribution of the light spot of the output beam. The output beam may be detected by multiple detectors or a detector array (e.g., a 1D or 2D array) disposed in a plane. The position, size, shape, and intensity distribution of the light spot may be detected in the plane. The spot position, spot size, spot shape, and spot intensity distribution are determined by the power level difference and phase difference of the two beams, and utilized to ascertain the weak beam.

As used herein, the term "spot position" of a beam indicates a position where the intensity of the beam is maximal; the term "spot size" of a beam indicates a dimension of an area where the intensity of the beam is above a given value; the term "spot shape" of a beam indicates a shape of an area where the intensity of the beam is above a given value; and the term "spot intensity distribution" of a beam indicates the intensity distribution in the spot of the beam. These characteristics are measured in a plane where detectors are arranged.

In some embodiments, a lens system (not shown) may be disposed between waveguides 16 and 17 and detectors 20-22. The lens system may generate a focused beam that impinges on detectors 20-22. In these cases, detectors 20-22 may be placed at a certain distance from the waveguides, and do not need to be very close to the waveguides.

Figure 3:
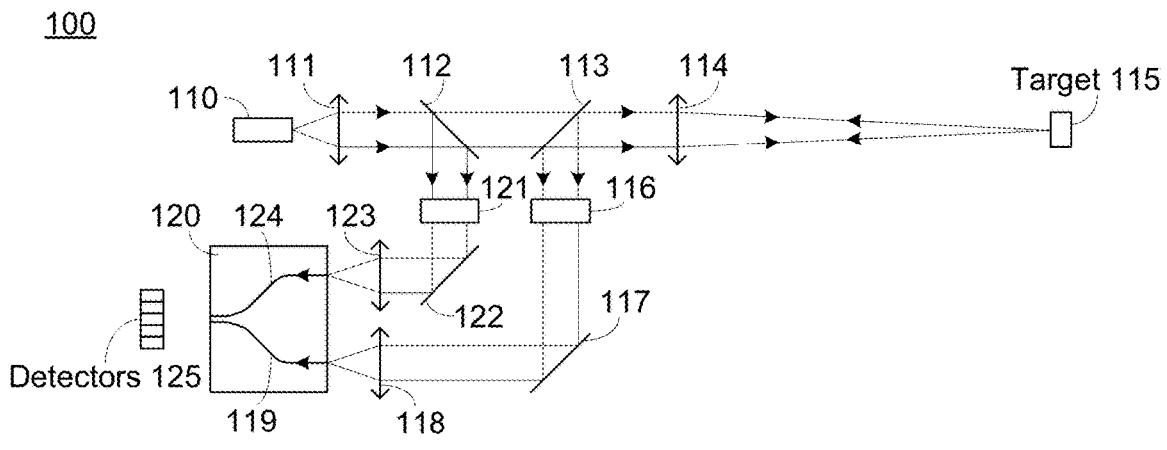
FIGS. 3 and 4 show embodiments to detect a target schematically.

FIG. 3 is schematic diagram that illustrates a top view of a configuration 100, according to embodiments of the present disclosure. Configuration 100 may be used to detect a target and the range of the target. For example, a light detection and ranging (LiDAR) system may be built based on the configuration.

As shown in FIG. 3, a beam is generated by a light source 110. Optionally, light source 110 is a laser system and the beam is a coherent beam. The beam becomes a collimated beam after passing through a lens system 111, and then is split into two beams by a partial reflector 112. One of the beams propagates forward, passes through another partial reflector 113, and is focused by a lens system 114. In some cases, the reflectivity of reflector 113 is around 50%. The focused beam impinges onto a target 115. Thereafter, a reflected beam, as a signal beam, returns from the target 115 and is collimated by lens system 114. The signal beam is reflected by reflector 113, reflected by a mirror 117 after passing through a modulator 116, and coupled into a waveguide 119 by a lens system 118. Waveguides 119 and 124 are formed on a substrate 120. Provided that the reflectivity of reflector 112 is low, e.g., lower than 1%. A small portion of the beam from light source 110, as a reference beam, is reflected by reflector 112, reflected by a mirror 122 after passing through a modulator 121, and coupled into waveguide 124 by a lens system 123. Modulator 116 is arranged to adjust the phase of the signal beam. Modulator 121 is arranged to adjust the phase and attenuate the power of the reference beam.

The signal and reference beams travel in waveguides 119 and 124, respectively. Similar to waveguides 16 and 17 shown in FIGS. 2A-2F, the width and height of waveguides 119 and 124 are around or smaller than the wavelength of the signal and reference beams. The spacing between waveguides 119 and 124 is around or smaller than the wavelength at the edge of the substrate that faces detectors 125. After the signal and reference beams are emitted from the waveguides, the spacing between the beams and the widths of the beams in a plane perpendicular to the substrate are around or smaller than the wavelength. Provided the signal and reference beams are coherent. The signal and reference beams interfere to form an output beam.

When there is no signal beam, the output beam is the reference beam. When the signal beam comes, the propagation direction of the output beam is changed by the interference, which may be detected by detectors 125. For optimized detection result, the phase of the signal beam may be adjusted by modulator 116, while the phase and power level of the reference beam may be adjusted by modulator 121. The phase difference between the signal beam and reference beam may be tuned to change the propagation direction of the output beam to make it more detectable. Optionally, the power of the reference beam is attenuated more when the signal beam is weaker. In some cases, detectors 125 may be a 1D or 2D detector array. Optionally, a lens system (not shown) may be placed between substrate 120 and detectors 125 that focuses the output beam and projects a spot or spots of the output beam on detectors 125. Detectors 125 may include a photodiode, APD, SPAD, PMT, TES, SNSPD, or other types of optical detecting devices.

Based on configuration 100, a weak signal beam from target 115 may be detected by ascertaining one or more characteristics of the output beam. The characteristics include the propagation direction of the output beam, and the position, size, shape, and intensity distribution of the light spot of the output beam. Compared to systems based on direct intensity measurement of a weak signal beam, the detection range of configuration 100 may be larger.

Figure 4:
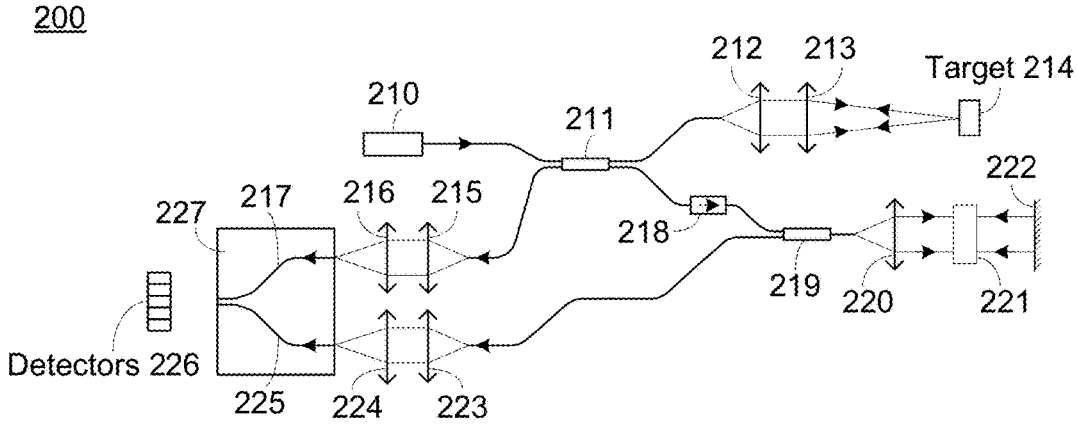

FIG. 4 is schematic diagram that illustrates a top view of a configuration 200, according to aspects of the present disclosure. Configuration 200 may be used to detect a target or sample. For example, a system of low-coherence interferometry (LCI) such as optical coherence tomography (OCT) may be built based on the configuration.

As shown in FIG. 4, a beam is generated by a light source 210 and fed into an optical fiber. In some cases, light source 210 may be a laser system. Optionally, light source 210 may be a low-coherence source, such as a light emitting diode (LED), a super luminescent diode (SLD), or an amplified spontaneous emission (ASE) light source. The beam is split into a first part and a second part by a fiberoptic coupler 211. The ratio of power between the first and second part may be around 50:50 in certain cases. The first part travels along a fiber and becomes a collimated beam after passing through a lens system 212. The collimated beam is focused by a lens system 213. The focused beam impinges onto a target or sample 214. Thereafter, a reflected beam, as sample signals, returns from the target 214 and is collimated by lens system 213. The sample signals are then fed into the fiber by lens system 212, split by coupler 211, and coupled into a waveguide 217 at the front edge of a substrate 227 by lens systems 215 and 216.

The second part, as reference signals, passes through a fiberoptic isolator 218, before entering another coupler 219. Fiberoptic isolator 218 is a device that allows signals to pass along one direction with low loss, while causes high loss of optical power along the opposite direction. It may be used to limit light reflected back to the light source to reduce interference with the light source. Optionally, another fiberoptic isolator (not shown) may be placed between light source 210 and coupler 211. Coupler 219 may divide the reference signals with a 50:50 split ratio. The reference signals are split by coupler 219, collimated by a lens system 220, and then reflected by a mirror 222. A modulator 221, disposed between coupler 220 and mirror 222, is arranged to adjust the phase and attenuate the power of the reference signals. Optionally, modulator 221 may also be used to adjust the optical path length of the reference signals. In some embodiments, mirror 222 is movable and used for changing the optical path length. The reference signals reflected from mirror 222 are fed into the fiber, split by coupler 219, and launched into a waveguide 225 at the front edge of substrate 227 by lens systems 223 and 224.

Waveguides 217 and 225 are formed on substrate 227. The sample and reference signals propagate along waveguides 217 and 225, respectively. Similar to waveguides 16 and 17, the width and height of waveguides 217 and 225 are around or smaller than the wavelength of the sample and reference signals. The spacing between waveguides 217 and 225 is around or smaller than the wavelength at the rear edge of the substrate that faces detectors 226. After the sample and reference signals are emitted from the waveguides at the rear edge of the substrate, they become a sample beam and reference beam, propagating side by side. The spacing between the sample and reference beams and the widths of the beams in a plane parallel to the rear edge of and perpendicular to the substrate are around or smaller than the wavelength. The signal and reference beams interfere to form an output beam.

When there is no signal beam, the output beam is the reference beam. When the signal beam is present, the propagation direction of the output beam may be changed by the interference between the two beams. The output beam is detected by detectors 226. In some embodiments, the phase difference between the sample beam and reference beam is adjusted by modulator 221, and is used to change the propagation direction of the output beam. The propagation direction of the output beam may be tuned to facilitate the detection. For applications of LCI or OCT, modulator 221 and/or movable mirror 222 may be adjusted such that the optical path length of the reference beam matches that of the sample beam. The optical path length corresponds to an optical path from light source 210 to one of detectors 226. As such, the phase difference between the sample and reference beams is close to zero. Thus, the sample beam will not be detected by sensing the propagation direction of the output beam. In such cases, the sample beam may be detected by ascertaining the spot size, spot shape, and/or spot intensity distribution of the output beam. The power of the reference beam is adjusted by modulator 221 so that the ratio of power between the reference beam and sample beam may be a value in a range of, for example, from 5 to 100. The reference beam is attenuated more when the signal beam is weaker.

In some cases, detectors 226 may be a 1D or 2D detector array extending in a plane perpendicular to substrate 227 and parallel to the rear edge of the substrate. Optionally, a lens system may be placed between substrate 227 and detectors 226 that focuses the output beam and projects a spot or spots of the output beam on detectors 226. Detectors 226 may include a photodiode, APD, SPAD, PMT, TES, SNSPD, or other types of optical detecting devices.

Based on configuration 200, a weak sample beam from a target or sample may be detected by ascertaining characteristics of an output beam. Compared to conventional systems, a deeper probing depth at a sample may be achieved in LCI and OCT applications.

Figure 5:
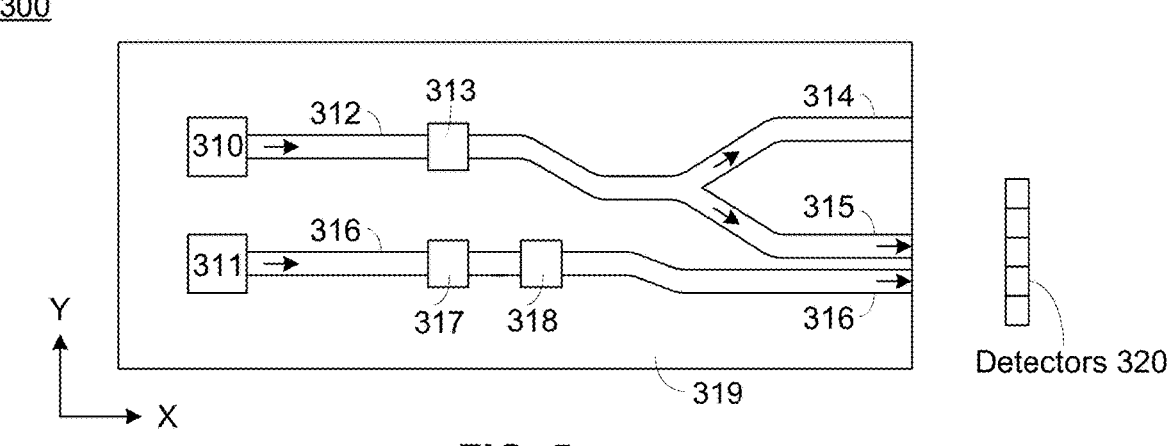
FIGS. 5 and 6 illustrate embodiments to detect a single photon schematically.

FIG. 5 is schematic diagram that illustrates a top view of a configuration 300 in an X-Y plane, according to embodiments of the present disclosure. Configuration 300 may be used to detect a weak beam, especially a single photon. Some systems that detect single photons may be made based on the configuration. For example, a quantum random number generator (QRNG) may be constructed using methods of configuration 300.

Configuration 300 includes light sources 310 and 311, waveguides 312 and 316 built on a substrate 319, and detectors 320. Provided light source 310 is a single-photon source that emits a single photon at a time or at a desired time. The beam from light source 310 may be referred to as an initial beam. Light source 311 generates a reference beam that contains multiple photons. Provided the initial and reference beams are coherent. The initial beam travels along waveguide 312. A modulator 313 is arranged to adjust the phase of the initial beam. Waveguide 312 is split into waveguides 314 and 315 by a Y structure (i.e., a Y-shaped waveguide structure) after the initial beam passes through modulator 313. The Y structure is configured to divide the initial beam into two parts with a 50:50 split ratio in terms of power level.

Light source 311 launches the reference beam in waveguide 316. The reference beam passes through modulator 317 and attenuator 318 that adjust the phase and reduce the power of the reference beam, respectively. Waveguides 315 and 316 are brought together at the edge of substrate 319. Similar to waveguides 217 and 225 of FIG. 4, the width and height of waveguides 312 and 314-316 are around or smaller than the wavelength of the initial and reference beams. The spacing between waveguides 315 and 316 is around or smaller than the wavelength at the edge of the substrate that faces detectors 320.

Since the Y structure splits the initial beam by a ratio of 50:50, a single photon has 50% chance to enter waveguide 315. Whether the single photon is fed into waveguide 315 is a random phenomenon in a quantum process. The beam propagating in waveguide 315 is referred to as a signal beam, which contains either a single photon or zero photon. Initially, light source 310 is off. The reference beam is the output beam. After light source 310 is turned on, the signal beam is sensed by detecting the change of the output beam. When the signal beam contains a single photon, the interference between the signal and reference beams happens, and the propagation direction of the output beam may be steered based on the phase difference. When waveguide 315 is empty, no interference occurs, the reference beam becomes the output beam, and the direction of the output beam remains unchanged. Hence, the signal beam may be detected by sensing the propagation direction of the output beam. As the signal beam is a single photon, the reference beam may have 50-100 photons. The power of the reference beam may be controlled by light source 311 and attenuator 318. Thus, detecting a single photon is changed into detecting multiple photons.

The output beam is detected by detectors 320. Similar to detectors 125 and 226, detectors 320 may be a 1D or 2D detector array. Optionally, a lens system may be placed between substrate 319 and detectors 320 to focus the output beam on detectors 320. Detectors 320 may include a photodiode, APD, SPAD, PMT, TES, SNSPD, or other types of optical detecting devices.

As illustrated above, waveguide 315 has no photon and the output beam is the reference beam at the beginning. The output beam is monitored by detectors 320 continuously. After light source 310 is turned on, waveguide 315 may carry a single photon on the random basis. When waveguide 315 emits a signal beam, i.e., a single photon, the interference of the single photon and the reference beam changes the propagation direction of the output beam. The phase difference between the signal and reference beams may be tuned by adjusting modulator 313 and/or 317, which changes the propagation direction of the output beam. The power ratio between the two beams may be adjusted via attenuator 318. Optimized phase difference and power ratio may be obtained to enhance the sensitivity and accuracy of single-photon detection.

The propagation direction of the output beam may be measured using the spot position. In addition, other characteristics of the output beam, such as spot shape, spot size, and/or spot intensity distribution, may be detected by detectors 320 and used to sense a single photon.

Compared to systems based on direct measurement of a single photon by certain detectors, the methods illustrated above may detect a single photon by sensing multiple photons, such as 50-100 photons, by the same detectors. As such, the PDE may be improved. Further, less sophisticated detectors may be used to lower the detection cost in some cases.

Figure 6:
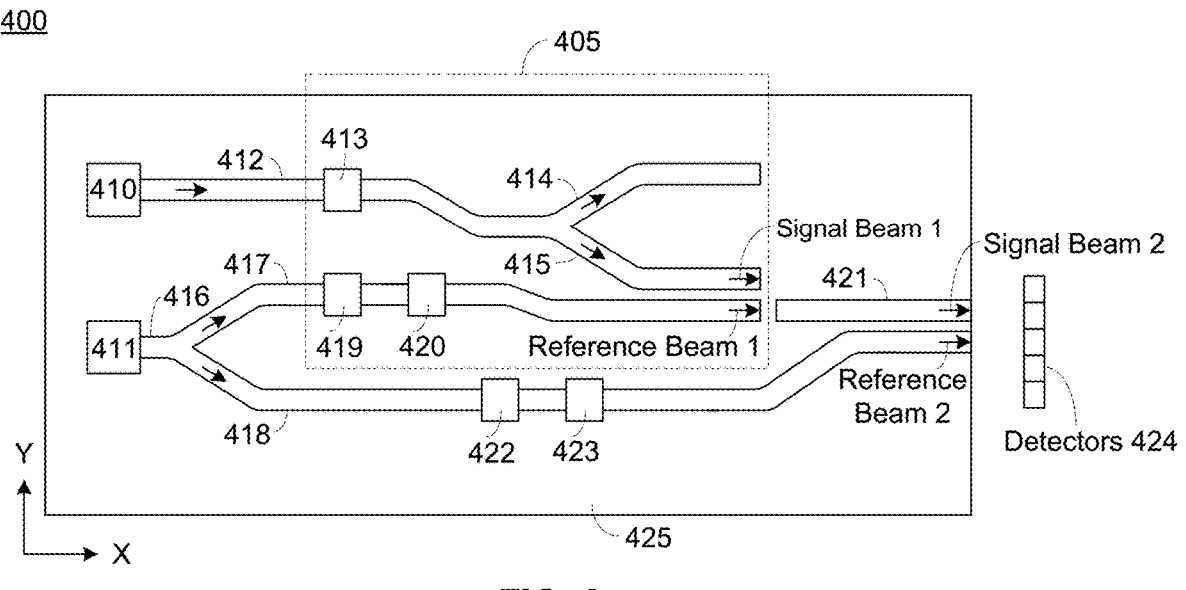

FIG. 6 is schematic diagram that illustrates a top view of a configuration 400 in an X-Y plane, according to embodiments of the present disclosure. Similar to configuration 300, configuration 400 may be used to detect a weak beam, especially single photons in systems like the QRNG. Configuration 400 includes two signal beams (e.g., signal beam 1 and signal beam 2), and two reference beams (e.g., reference beam 1 and reference beam 2). Provided signal beam 1 and reference beam 1 are coherent, and signal beam 2 and reference beam 2 are coherent. Configuration 400 also includes a section 405 that has similar structures to those of configuration 300. Section 405, as illustrated by dashed lines in FIG. 6, may be considered as the first detection stage. Signal beam 1 interferes with reference beam 1 to produce an output beam 1 at the first detection stage. Output beam 1 is converted into signal beam 2 that interferes with reference beam 2 to produce an output beam 2 at the second detection stage. Detection of output beam 2 is used to detect whether signal beam 1 contains a single photon.

Configuration 400 further includes light sources 410 and 411, waveguides 412 and 416-418 on a substrate 425, and detectors 424. Provided light source 410 is a single-photon source, and light source 411 generates a beam with multiple photons. Light source 410 launches an initial beam in waveguide 412 that is split into waveguides 414 and 415 by a Y structure (e.g., a Y-shaped waveguide structure). The Y structure is made to split a beam into two parts with a split ratio of 50:50. The initial beam passes through a modulator 413 that modulates the phase of the initial beam.

Light source 411 launches a reference beam in waveguide 416 that is connected to waveguides 417 and 418 via a splitting structure. The splitting structure divides the reference beam into a reference beam 1 and a reference beam 2. Reference beams 1 and 2 travel along waveguides 417 and 418, respectively. Reference beam 1 passes through modulator 419 and attenuator 420 that adjust the phase and attenuate the power of reference beam 1, respectively. Reference beam 2 passes through modulator 422 and attenuator 423 that adjust the phase and attenuate the power of reference beam 2, respectively. Waveguides 415 and 417 are brought together at the ends of the waveguides. Waveguide 418 and another waveguide 421 are brought together at the edge of the substrate 425.

Similar to waveguides 16 and 17 of FIG. 2B, the width and height of the waveguides shown in FIG. 6 are around or smaller than the wavelength of the initial and reference beams. The spacing between waveguides 415 and 147 is around or smaller than the wavelength at the ends of the waveguides. The spacing between waveguides 418 and 421 is around or smaller than the wavelength at the edge of the substrate that faces detectors 424.

Since the Y structure splits the initial beam by a ratio of 50:50, a single photon has 50% chance to enter waveguide 415. Whether the single photon is fed into waveguide 415 to become signal beam 1 is a random phenomenon in a quantum process. Provided reference beam 1 has 100 photons after passing through attenuator 420. The power of reference beam 1 is controlled by light source 411, the splitting structure, and attenuator 420.

At the beginning, light source 410 is off and light source 411 is turned on. Thus, signal beam 1 has zero power. Reference beam 1 is emitted from waveguide 417 to become output beam 1. As waveguide 417 is aligned with waveguide 421 and separated from it by a certain short distance, output beam 1 is aligned with waveguide 421, and a large portion (e.g., 80%) of output beam 1 may be coupled into waveguide 421. Optionally, a lens may be inserted between waveguides 417 and 421 to improve the coupling efficiency. The part of output beam 1 that propagates in waveguide 421 becomes signal beam 2 and is emitted from waveguide 421. On the other hand, after passing through modulator 422 and attenuator 423, reference beam 2 is emitted from waveguide 418. The phase difference between signal beam 2 and reference beam 2 may be tuned by modulator 422. Signal beam 2 and reference beam 2 merge and interfere with each other to produce output beam 2, which is detected by detectors 424. Detectors 424 may monitor output beam 2 continuously.

After light source 410 is switched on, waveguide 415 may carry a single photon on the random basis. When no photon enters waveguide 415, output beam 1 and output beam 2 remain the same as if light source 410 is still off. When a single photon enters waveguide 415 to become signal beam 1, the interference of signal beam 1 and reference beam 1 creates output beam 1. The phase difference between signal beam 1 and reference beam 1 may be tuned by adjusting modulator 413 and/or 419, which changes the propagation direction of output beam 1 such that output beam 1 becomes misaligned with waveguide 421. Provided a small portion (e.g., less than 10%) of output beam 1 is coupled into waveguide 421. The part of output beam 1 that propagates in waveguide 421 becomes signal beam 2 and is emitted from waveguide 421.

As aforementioned, assuming reference beam 1 has 100 photons. When no photon enters waveguide 415, signal beam 1 has no power, and signal beam 2 may have 80 photons. When a single photon enters waveguide 415, signal beam 1 has the single photon, and signal beam 2 may have 8 photons. As such, a single photon may be detected by sensing the change of signal beam 2 between 8 photons and 80 photons. Further, in some aspects, reference beam 2 may have 8000 photons. Detecting a single photon becomes detecting the change of output beam 2 that contains 8000 photons. The change of output beam 2 may be sensed by detecting one or more characteristics of output beam 2, e.g., the position, size, shape, and/or intensity distribution of the spot of output beam 2.

Optionally, a lens system may be placed between substrate 425 and detectors 424 to focus output beam 2 on detectors 424. Detectors 424 may include a photodiode, APD, SPAD, PMT, TES, SNSPD, or other types of optical detecting devices. Compared to systems based on direct measurement of a single photon by certain detectors, the methods illustrated above and shown in FIG. 6 detect a single photon by ascertaining, e.g., as many as 8000 photons. Hence, the PDE may be improved when the same type of detectors are used.

Figure 7A:
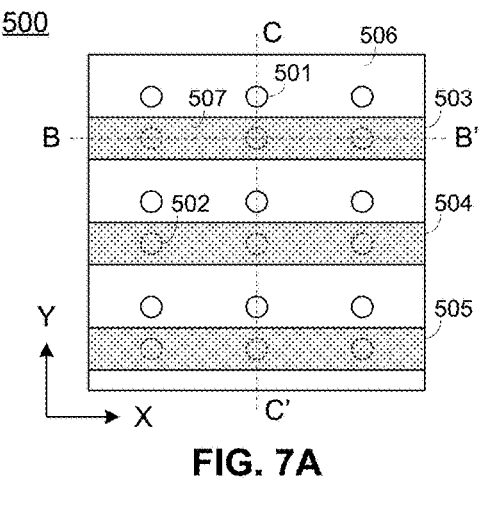
FIGS. 7A to 7D illustrate embodiments to detect an image schematically.
Figure 7B:
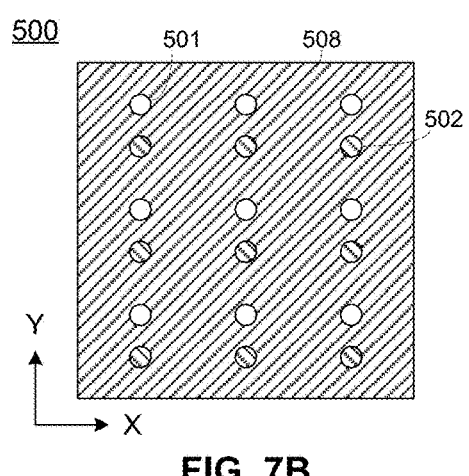
Figure 7C:
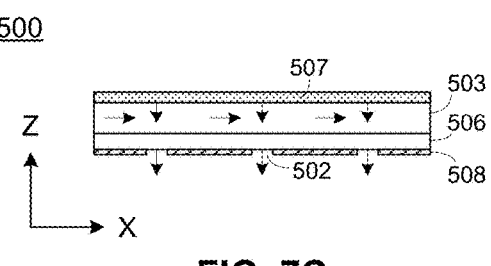
Figure 7D:
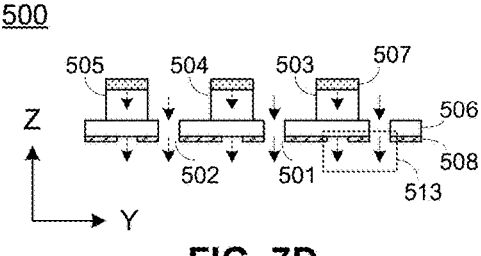

FIGS. 7A-7D show schematic views of a configuration 500 for detecting an image according to embodiments of the present disclosure. FIGS. 7A and 7B illustrate a top view and a bottom view of the configuration, respectively. FIGS. 7C and 7D illustrate cross-sectional views taken along a line BB' and a line CC' depicted in FIG. 7A, respectively. Arrows in the figures indicate directions of light waves in waveguides and free space. Assuming light waves and beams used herein have a preset wavelength. Configuration 500 exemplarily includes holes 501 and 502 of two different types, waveguides 503, 504, and 505 that extend in the X direction, and a substrate 506. Holes 501 are beside the waveguides. Holes 502 are under the waveguide, invisible in FIG. 7A, and depicted in dotted lines.

Holes 501 form an array, while holes 502 form another array. The two arrays have the same size, the same pattern, and are disposed in positions with a small offset. Waveguides 503-505 are made on substrate 506 and form a 1D array. Substrate 506 may also function as a cladding layer of the waveguides. Optionally, a buffer layer (not shown) may be formed between the waveguide (i.e., a core layer) and substrate 506. Optionally, a grating layer 507 is formed at the top of the waveguide, and an absorption layer 508 is deposited below substrate 506. Holes 501 penetrate through substrate 506 and absorption layer 508 completely. Holes 502 penetrate through absorption layer 508 completely. Optionally, holes 502 may penetrate into substrate 506 in some cases. Grating layer 507 may be made by etching the core layer. Grating layer 507 contains a grating coupler (not shown) that may have periodically distributed shallow grooves. Substrate 506 is between absorption layer 508 and the waveguides. Absorption layer 508 is configured to receive and absorb light waves that enter the layer, reducing the detection noise and interference.

The grating coupler couples a light wave travelling in the waveguide along the X direction and a free-space wave traveling in the Z direction through refractive index modulation. Part of the light wave in the waveguide changes the prorogation direction under the influence of the grating coupler, and propagates in the vertical direction, i.e., in and against the Z direction. As such, a small part of the light wave is transmitted out of holes 502 and becomes reference beams propagating downward against the Z direction. The array of holes 502 generates an array of the reference beams. Rest of the light waves propagating in the vertical direction either goes out of the waveguide through grating layer 507 or is absorbed by absorption layer 508.

Holes 501 and 502 have a dimension (or diameter) close to or smaller than the wavelength of the light waves in the waveguides. The separation (or spacing) between a hole 501 and its adjacent hole 502 is close to or smaller than the wavelength in the Y direction. A pair of adjacent holes 501 and 502 form a sensing unit 513 of configuration 500. An imaging mechanism or device may be made based on configuration 500. When a weak beam of the wavelength from a sample (or target) is focused on an XY plane of substrate 506, part of the beam passes through holes 501 respectively, generating weak signal beams. The signal beams propagate against the Z direction and form an image of the sample. Each signal beam passes through a corresponding hole 501, or is emitted by the corresponding hole 501. A signal beam and a reference beam at a sensing unit 513 interfere to produce an output beam. Since the signal and reference beams have dimensions and separation close to or smaller than the wavelength in an XY plane, the signal beam may be detected by sensing the output beam via the above-described methods. For example, the power of the reference beam may be at last five times larger than that of the signal beam. The signal and reference beams may come from a laser source and be coherent in some cases. The signal and reference beams may also come from a low-coherent (or broadband) light source and be incoherent in some other cases.

The image formed by the weak signal beams may be detected by using the array of the reference beams. As aforementioned, the array of the reference beams is generated by the array of holes 502. Sensing units 513 form a sensing array that has the same size and same pattern as that of holes 501 and 502. The imaging quality is related to characteristics of the sensing array, such as the pitch between adjacent sensing units and the area of the sensing array. To prevent stray beams from entering holes 501 from the waveguides, sidewalls of holes 501 and the waveguides may be coated with a reflective layer (not shown).

FIG. 7E shows schematically an arrangement using configuration 500 shown in FIGS. 7A-7D. The arrangement shown in FIG. 7E may be used to make a LiDAR, LCI, or OCT system. It contains configuration 500, a lens system 510, and detectors 511. Detectors 511 form a 2D detector array. Light waves from a sample 512 are focused in a plane of substrate 506 by lens system 510. The focused light waves are transformed into signal beams after passing through holes 501. The signal beams forms an image of sample 512. As illustrated above, two adjacent signal beam and reference beam at a sensing unit 513 interfere to generate an output beam. The signal beam is detected through sensing the output beam. After the output beams are detected, the image of sample 512 may be obtained. As described above, the reference beam may be much stronger than the signal beam. Hence, an image based on weak beams may be detected via interference between each of the weak beams and a corresponding reference beam. Detectors 511 may be the same as or similar to the aforementioned detectors (e.g., detectors 226 and 320 as shown in FIGS. 4 and 5). Optionally, another lens system (not shown) may be placed between configuration 500 and detectors 511. The other lens system focuses the output beams and projects an image formed by the output beams on detectors 511.

FIGS. 8A and 8B show schematically a top view and a bottom view of a configuration 600 for detecting an image according to embodiments of the present disclosure. The structure of configuration 600 is similar to that of configuration 500, except the shape and size difference between holes 501 and holes 601. Configuration 600 contains holes 601 and 602, waveguides 603, 604, and 605, a substrate 606, a grating layer 607 at the top of the waveguide, and an absorption layer 608 on the bottom of substrate 606. Holes 602 are invisible in FIG. 8A and depicted in dotted lines. Like holes 501, holes 601 penetrate through substrate 606 and absorption layer 608 completely. Like holes 502, holes 602 may be round and formed by etching absorption layer 608. Holes 602 only pass through absorption layer 608 in some cases. While holes 501 have a circular shape, holes 601 may have a rectangular shape with round corners and elongate in the X direction. The dimension of holes 601 in the X direction may be larger than that in the Y direction, e.g., two times larger. As the area of hole 601 is larger than that of hole 501, holes 601 may generate a stronger signal beam than holes 501. Stronger signal beams are easier to be detected, thereby facilitating image detection.

Figures 9A, 9B, 9C, 9D, 10:
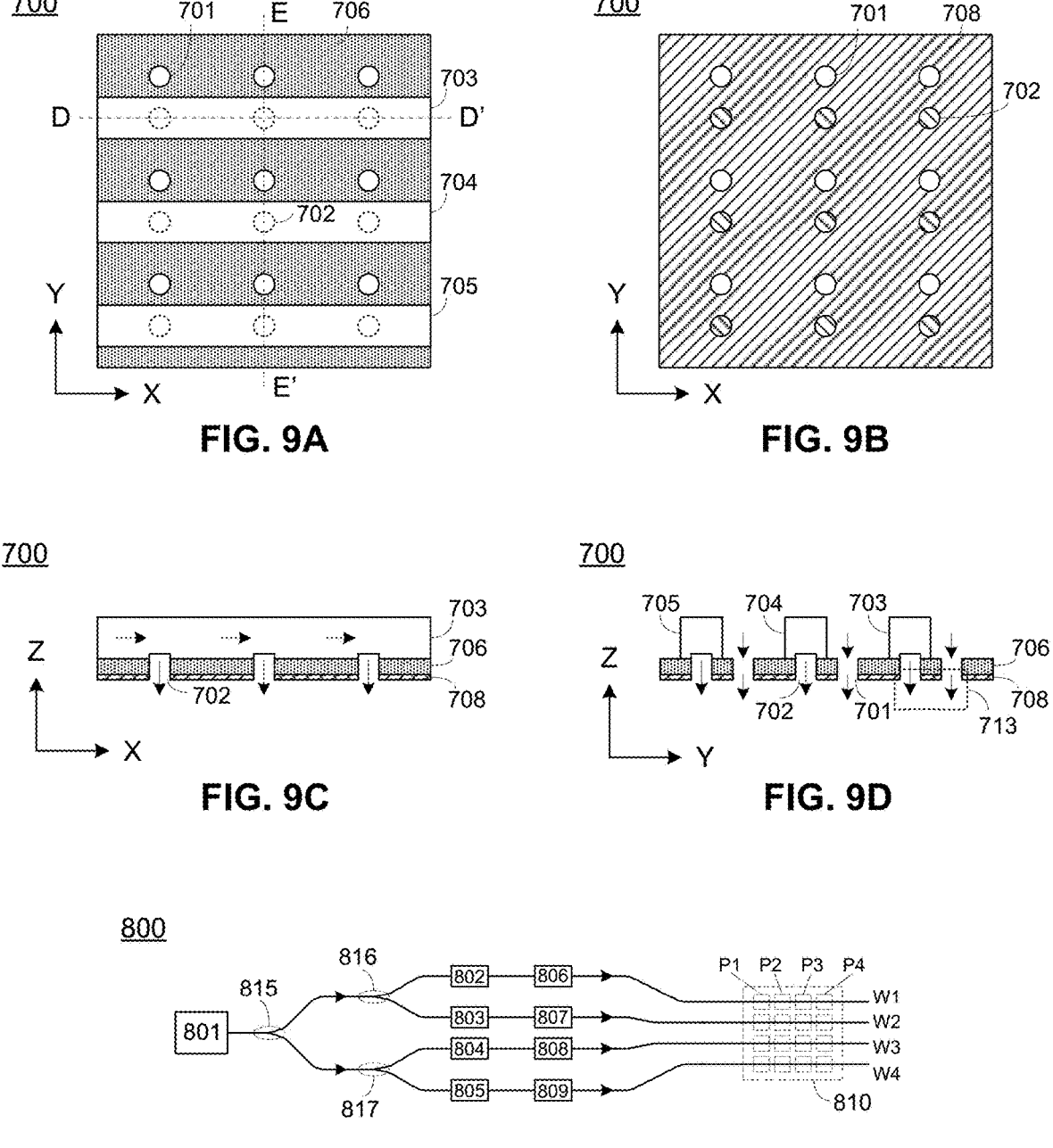
FIGS. 9A to 9D illustrate another embodiment to detect an image schematically.
FIG. 10 illustrates a configuration to detect an image schematically.

FIGS. 9A-9D show schematic views of a configuration 700 for detecting an image according to embodiments of the present disclosure. FIGS. 9A and 9B illustrate a top view and a bottom view of the configuration, respectively. FIGS. 9C and 9D illustrate cross-sectional views taken along a line DD' and a line EE' depicted in FIG. 9A, respectively. Arrows in the figures indicate directions of light waves in waveguides and free space. Configuration 700 exemplarily includes holes 701 and 702 of two different types, waveguides 703, 704, and 705, a substrate 706, and an absorption layer 708. As holes 702 are under the waveguides, they are invisible in FIG. 9A and depicted in dotted lines. Holes 701 form an array, while holes 702 form another array. The two arrays have the same size, the same pattern, and a position offset. Waveguides 703-705 are formed on substrate 706 and extend in the X direction. Substrate 706 may also be a cladding layer of the waveguides. Optionally, a buffer layer (not shown) may be formed between the waveguide (i.e., a core layer of the waveguide) and substrate 706. Absorption layer 708 is deposited below substrate 706. Substrate 706 is between absorption layer 708 and the waveguides. Unlike configuration 500 shown in FIGS. 7A-7D, no grating layer is formed at the top of the waveguides 703-705. Holes 701 pass through substrate 706 and absorption layer 708 completely. Holes 702 penetrate substrate 706 and absorption layer 708 completely, and reach the core layer of the waveguide by penetrating it partially. Holes 702 may function as a defect of the waveguide. Light waves travelling in the waveguide interact with holes 702, generating leaky waves. Part of the leaky wave comes out of holes 702 and becomes an array of reference beams propagating against the Z direction.

Holes 701 and 702 have a dimension (or diameter) close to or smaller than the wavelength of the light waves. Each hole 701 is spaced apart from an adjacent hole 702 with a separation between them close to or smaller than the wavelength in the Y direction. A sensing unit 713 of configuration 700 contains a pair of adjacent holes 701 and 702. An imaging mechanism/device may be built based on configuration 700. When a beam from a sample is focused on an XY plane of substrate 706, part of the beam passes through holes 701 respectively and is transformed into signal beams propagating against the Z direction. The signal beams form an image of the sample.

Similar to configuration 500, a pair of adjacent signal and reference beams generated at a sensing unit 713 has dimensions and a separation close to or smaller than the wavelength in the XY plane. The signal and reference beams interfere to produce an output beam. The signal beam may be detected be sensing the output beam. The image may be obtained using detection results of the output beams at the sensing units. Similar to configuration 500, in order to prevent stray beams from entering holes 701, sidewalls of holes 701 and the waveguides 703-705 may be coated with a reflective layer.

FIG. 10 illustrates schematically an arrangement 800 for detecting an image formed by weak beams. Arrangement 800 may be used to build a LiDAR, LCI, or OCT system. The arrangement includes a light source 801, phase modulators 802-805, attenuators 806-809, an array structure 810, and splitting structures 815-817. Array structure 810 contains waveguides W1-W4 that are parallel to each other and form a 1D waveguide array. Splitting structures 815-817 may be Y-shaped waveguide structures that split a beam into two parts with a split ratio of 50:50.

Light source 810 launches a beam in a waveguide. Splitting structure 815 splits the beam into two parts and each part is split again by splitting structures 816 and 817, respectively. As such, four beams are fed into waveguides W1-W4, respectively. Optionally, another splitting structure (not shown) may be disposed between light source 801 and splitting structure 815, and split the beam into a first portion and a second portion. The first portion travels to splitting structure 815, while the second portion is transmitted to a target as a probe beam. As shown in FIG. 10, the beam in waveguide W1 passes through phase modulator 802 and attenuator 806, and then enters array structure 810.

The structure of array structure 810 may be similar to one of the above-illustrated configurations, such as configuration 500 or 700. The above-described detection methods may be used for arrangement 800. For example, array structure 810 may have an array of first holes and an array of second holes. The array of the first holes is configured to receive reflected light from the target for producing signal beams. The signal beams carry an image of the target. The array of the second holes is formed on the waveguides W1-W4 for generating an array of reference beams. A pair of adjacent first and second holes forms a sensing unit of array structure 810. Interference between adjacent signal and reference beams at a sensing unit generates an output beam that is ascertained to determine the status of a pixel of the image. The sensing units form a sensing array, such as a 4×4 array at array structure 810 which is exemplarily shown in FIG. 10. As a pixel corresponds to a sensing unit, array structure 810 provides a 4×4 pixel array.

When a light wave propagates in waveguide W1, it passes sensing units P1, P2, P3, and P4 sequentially, and creates four reference beams at different times. As such, when signal beams from the target interfere with reference beams from the waveguides, the values of phase difference are different among the sensing units. For example, when a pair of adjacent signal and reference beams is in phase, other pairs of adjacent signal and reference beams might not be in phase. When a detection condition requires that adjacent signal and reference beams have a certain phase difference, e.g., in phase or out of phase (e.g., 180 degrees out of phase), the phase of each reference beam may be tuned separately to meet the condition.

For example, phase modulator 802 may adjust the phase of one reference beam among the four at sensing units P1-P4 at a time. In addition, when the phase of a reference beam is tuned, attenuator 806 may adjust the power level of the reference beam at the same time. As such, when a signal beam is sensed, the phase and power of its adjacent reference beam may be adjusted specifically to reach a predetermined sensing condition. Such a tuning process may be repeated for each pair of signal and reference beams at the sensing units. An image may be obtained after all signal beams are measured, i.e., all pixels are measured.

Although the description above contains many specificities, these should not be construed as limiting the scope of the invention but as merely providing illustrations of some of the presently preferred embodiments. Numerous modifications will be obvious to those skilled in the art. Therefore the scope of the invention should be determined by the appended claims and their legal equivalents, rather than by the examples given.

I claim:

1. A method for detecting an image formed by a plurality of first optical beams of a first wavelength, comprising:
  providing a plurality of second optical beams of a second wavelength, a width of one of the plurality of second optical beams being smaller than one and a half times of the second wavelength;
  causing one of the plurality of first optical beams and the one of the plurality of second optical beams to interfere to generate an output beam;
  detecting a characteristic of the output beam; and
  using the characteristic to detect a pixel of the image.

2. The method according to claim 1, further comprising:
  providing a substrate including a plurality of holes, each first optical beam passing through a corresponding one of the plurality of holes.

3. The method according to claim 1 wherein a width of the one of the plurality of first optical beams is smaller than one and a half times of the first wavelength.

4. The method according to claim 1 wherein a spacing between the one of the plurality of first optical beams and the one of the plurality of second optical beams is smaller than one and a half times of the second wavelength.

5. The method according to claim 1 wherein power of the one of the plurality of second optical beams is at least five times larger than power of the one of the plurality of first optical beams.

6. The method according to claim 1 wherein the one of the plurality of first optical beams and the one of the plurality of second optical beams are coherent.

7. The method according to claim 1, further comprising:
  adjusting a phase of the one of the plurality of second optical beams to change the characteristic of the output beam.

8. A method for detecting an image formed by a plurality of first optical beams of a first wavelength, comprising:

providing a plurality of second optical beams of a second wavelength, power of one of the plurality of second optical beams beam being at least five times larger than power of one of the plurality of first optical beams;

causing the one of the plurality of first optical beams and the one of the plurality of second optical beams to interfere to generate an output beam;

detecting a characteristic of the output beam; and using the characteristic to detect a pixel of the image.

9. The method according to claim 8, further comprising:

providing a substrate including a plurality of holes, each first optical beam passing through a corresponding one of the plurality of holes.

10. The method according to claim 8 wherein a width of the one of the plurality of first optical beams is smaller than one and a half times of the first wavelength.

11. The method according to claim 8 wherein a width of the one of the plurality of second optical beams is smaller than one and a half times of the second wavelength.

12. The method according to claim 8 wherein a spacing between the one of the plurality of first optical beams and the one of the plurality of second optical beams is smaller than one and a half times of the second wavelength.

13. The method according to claim 8 wherein the one of the plurality of first optical beams and the one of the plurality of second optical beams are coherent.

14. The method according to claim 8, further comprising:

adjusting a phase of the one of the plurality of second optical beams to change the characteristic of the output beam.

15. A method for detecting an image formed by a plurality of first optical beams of a first wavelength, comprising:

providing a plurality of second optical beams of a second wavelength, a spacing between one of the plurality of first optical beams and one of the plurality of second optical beams being smaller than one and a half times of the second wavelength;

causing the one of the plurality of first optical beams and the one of the plurality of second optical beams to interfere to generate an output beam;

detecting a characteristic of the output beam; and using the characteristic to detect a pixel of the image.

16. The method according to claim 15, further comprising:

providing a substrate including a plurality of holes, each first optical beam passing through a corresponding one of the plurality of holes.

17. The method according to claim 15 wherein a width of the one of the plurality of first optical beams is smaller than one and a half times of the first wavelength.

18. The method according to claim 15 wherein a width of the one of the plurality of second optical beams is smaller than one and a half times of the second wavelength.

19. The method according to claim 15 wherein power of the one of the plurality of second optical beams is at least five times larger than power of the one of the plurality of first optical beams.

20. The method according to claim 15, further comprising:

adjusting a phase of the one of the plurality of second optical beams to change the characteristic of the output beam.

* * * * *